United States Patent
Wollack et al.

(10) Patent No.: US 9,310,556 B1
(45) Date of Patent: Apr. 12, 2016

(54) PHOTONIC WAVEGUIDE CHOKE JOINT WITH NON-ABSORPTIVE LOADING

(71) Applicant: The United States of America as represented by the Administrator of the National Aeronautics and Space Administration, Washington, DC (US)

(72) Inventors: Edward J. Wollack, Glenn Dale, MD (US); Kongpop U-Yen, Arlington, VA (US); David T. Chuss, Bowie, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/501,493

(22) Filed: Sep. 30, 2014

(51) Int. Cl.
| | |
|---|---|
| *G02B 6/26* | (2006.01) |
| *G02B 6/14* | (2006.01) |
| *G02B 6/125* | (2006.01) |
| *G02B 6/293* | (2006.01) |
| *G02B 6/30* | (2006.01) |
| *H01P 1/20* | (2006.01) |
| *G02B 6/122* | (2006.01) |
| *G02B 6/12* | (2006.01) |

(52) U.S. Cl.
CPC *G02B 6/14* (2013.01); *G02B 6/125* (2013.01); *G02B 6/29389* (2013.01); *G02B 6/29398* (2013.01); *G02B 6/12007* (2013.01); *G02B 6/1225* (2013.01); *G02B 6/1228* (2013.01); *G02B 6/30* (2013.01); *H01P 1/20* (2013.01); *H01P 1/2002* (2013.01); *H01P 1/2005* (2013.01)

(58) Field of Classification Search
CPC .... G02B 6/1225; G02B 6/12007; G02B 6/30; G02B 6/125; G02B 6/12147; G02B 6/1228; G02B 2006/12109; H01P 1/20; H01P 1/2002; H01P 1/2005

USPC .......................................................... 385/29
See application file for complete search history.

(56) References Cited

U.S. PATENT DOCUMENTS

| | | | | | |
|---|---|---|---|---|---|
| 6,589,334 | B2* | 7/2003 | John | .............. | B82Y 20/00 117/1 |
| 6,631,236 | B2* | 10/2003 | Yamada | .............. | G02B 6/1225 385/129 |
| 6,853,350 | B2* | 2/2005 | Alexopoulos | .......... | H01P 1/2005 343/700 MS |
| 7,418,161 | B2* | 8/2008 | Mouli | .............. | G02B 6/1225 385/1 |
| 7,632,700 | B2* | 12/2009 | Mouli | .............. | G02B 5/20 438/70 |
| 8,693,828 | B2* | 4/2014 | Wollack | .............. | H01P 1/00 385/50 |
| 8,705,920 | B2* | 4/2014 | Tokushima | .......... | B82Y 20/00 385/27 |
| 2005/0263675 | A1* | 12/2005 | Mouli | .............. | G02B 5/20 250/208.1 |
| 2010/0226609 | A1* | 9/2010 | Tokushima | .......... | B82Y 20/00 385/50 |
| 2010/0278487 | A1* | 11/2010 | Tokushima | .......... | B82Y 20/00 385/43 |
| 2011/0280518 | A1* | 11/2011 | Wollack | .............. | H01P 1/00 385/50 |

* cited by examiner

Primary Examiner — Ryan Lepisto
Assistant Examiner — Guy Anderson

(57) ABSTRACT

A waveguide choke joint includes a first array of pillars positioned on a substrate, each pillar in the first array of pillars having a first size and configured to receive an input plane wave at a first end of the choke joint. The choke joint has a second end configured to transmit the input plane wave away from the choke joint. The choke joint further includes a second array of pillars positioned on the substrate between the first array of pillars and the second end of the choke joint. Each pillar in the second array of pillars has a second size. The choke joint also has a third array of pillars positioned on the substrate between the second array and the second end of the choke joint. Each pillar in the third array of pillars has a third size.

18 Claims, 7 Drawing Sheets

PHOTONIC WAVEGUIDE CHOKE JOINT WITH NON-ABSORPTIVE LOADING

ORIGIN OF THE INVENTION

The invention described herein was made by an employee of the United States Government and may be manufactured and used by or for the Government of the United States of America for governmental purposes without the payment of any royalties thereon or therefor.

BACKGROUND

1. Technical Field

The present disclosure relates to a flat metalized surface waveguide flange having more than one arrays of square pillars arranged in a periodic pattern to suppress the dominant-mode wave propagation in a parallel plate waveguide.

2. Introduction

A dual polarized waveguide photonic choke joint (PCJ) is realized with square conductive pillars optimally designed to provide stop-band over a limited range of operating frequencies. However, above the signal band, the wavelength becomes small relative to the pillar size and spacing allowing undesired propagation through the PCJ structure. This is demonstrated in the Ansoft High Frequency Structural Simulator (HFSS) for an infinitely wide pillar array shown in FIGS. 3 and 4, where two metal surfaces are separated by two dielectrics, with the thickness of $t_1$ and $t_2$. Perfect magnetic walls are used as a boundary condition to mimic the effect of an infinitely wide tiling and a plane wave is launched into the dielectric space between two conductor surfaces with the thickness of $t_1$ and $t_2$ as shown in FIG. 4. By sending a plane wave signal to port 1 and receiving at port 2, one observes a broad-stop band and spurious responses out-of-band as shown in FIG. 5. This approach however provides only limited out-of-band rejection capabilities.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Photonic crystal structures are widely used in controlling the propagation of light. In microwave applications, these structures consist of dielectric or metallic pillars. The method of images enables one to view such a structure as an artificial dielectric. For interfacing with a parallel plate planar waveguide, these posts are arranged in a two-dimensional tiling between flat conducting metal surfaces as shown in FIGS. 1 and 2. Two metal surfaces 102, 104 behave as mirrors for the periodic posts 108, producing an imaginary three-dimensional tiling observed by an incident electromagnetic wave. FIG. 1 illustrates the waveguide prior to assembly, and FIG. 2 illustrates the waveguide 200 after assembly with an optional dielectric 104. The size and shapes of the pattern determine the operating frequency band where signal is reflected and behaves as a band-stop filter. The tiling pattern can be used as a part of the waveguide interface for low-loss power transmission without physical contact. The pillar structure is a feature that allows the waveguide to be operated with a large temperature gradient between the transmission line's opposing conductors. In addition, the spacing between conductors can be used for housing planar circuitry for remote sensing applications.

To address the issues raised above, the present disclosure presents a photonic waveguide choke joint designed as a low-loss waveguide interface with out-of-band radiation leakage suppression capability. A choke joint includes a first array of pillars positioned on a substrate, each pillar in the first array of pillars having a first size and configured to receive an input plane wave at a first end of the choke joint. The choke joint has a second end configured to transmit the input plane wave away from the choke joint. The choke joint further includes a second array of pillars positioned on the substrate between the first array of pillars and the second end of the choke joint. Each pillar in the second array of pillars has a second size. The choke joint also has a third array of pillars positioned on the substrate between the second array and the second end of the choke joint. Each pillar in the third array of pillars has a third size. Each of the first size, the second size and the third size can be the same or different sizes, or a variation thereof.

BRIEF DESCRIPTION OF THE DRAWINGS

FIG. 9 is a simulated electric field;

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

This disclosure presents a low-loss non-contact waveguide interface with out-of-band radiation leakage suppression capability. It is designed to be used as part of the low noise cryogenic detector package. The waveguide can be used for loss measurement of a flat surface at microwave and mm-wave frequencies.

This disclosure introduces a series of PCJs with various pillar sizes and spacings to extend its out-of-band rejection capabilities. Performance limitations on suppression capabilities are addressed as well as the hardware implementation.

Figure 6:
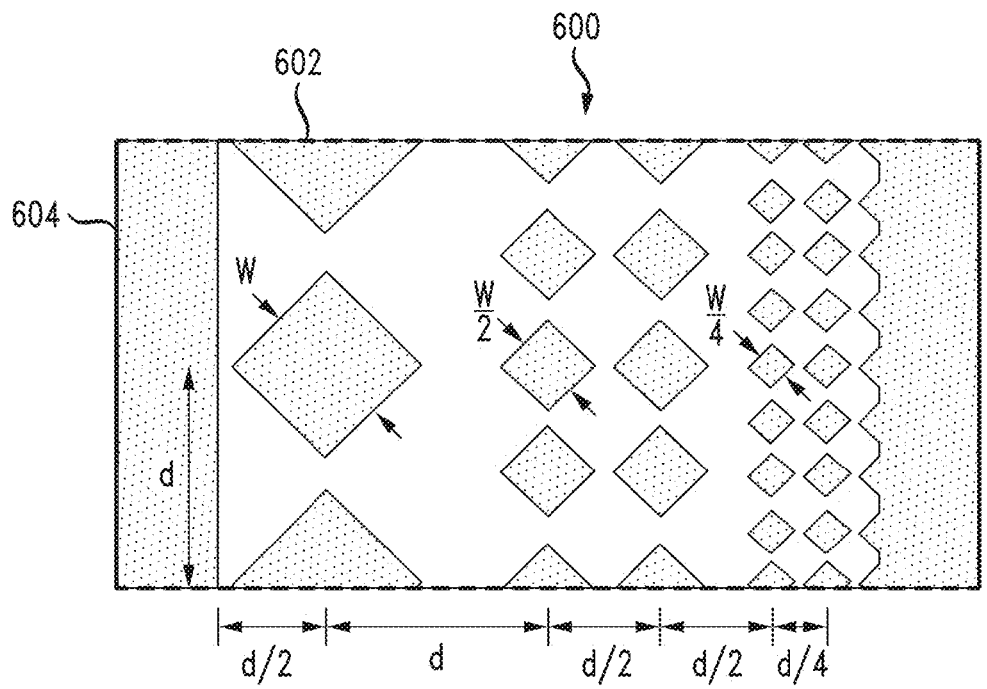
FIG. 6 illustrates a version of the photonic choke joint with a particular pillar structure.
Figure 7:
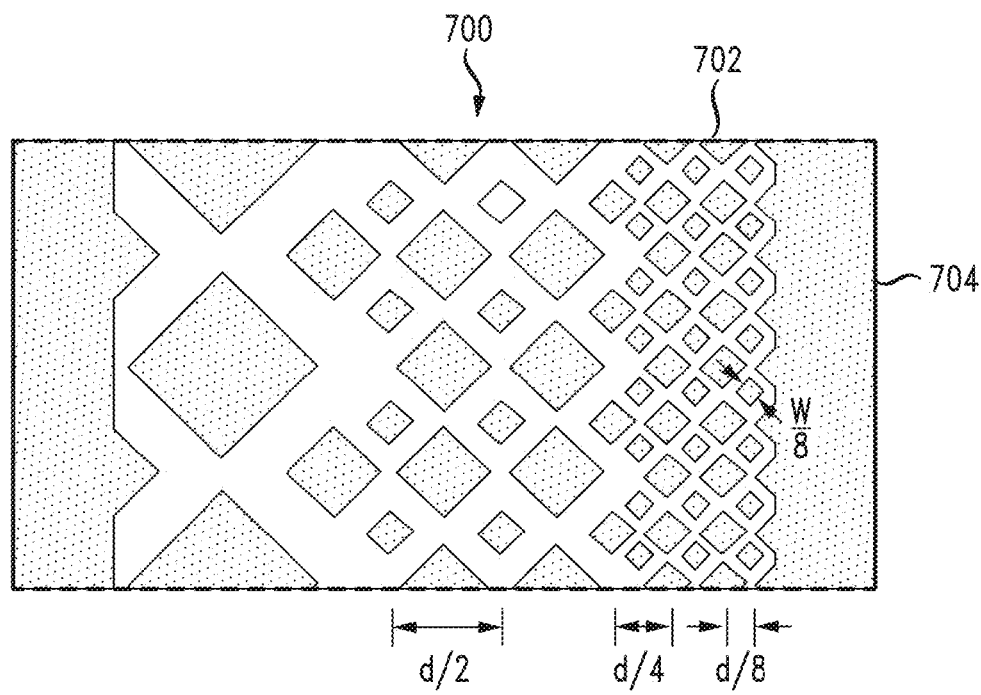
FIG. 7 illustrates another version of the photonic choke joint with a different pillar structure.

Several embodiments of the PCJs are disclosed which in different ways result in increasing the reject-band of the PCJ. For example, square pillar arrangements (with three or four different sizes and spacings) is one proposed embodiment. As shown in FIG. 6, the pillars are arranged in the PCJ 600 with the row of the largest pillar size, which defines the lower edge of the stop-band, facing the input port. The magnetic wall is shown as feature 602 and the plane wave excitation port is shown as feature 604. For consistency with other work, the inventors used an improved or optimized pillar width (w) and spacing (d) of 0.4a and 0.68a, respectively, and scaled the PCJ to operate at the center operating frequency ($f_0$) of 8 GHz. The width of the waveguide broadwall is a=17.15 mm. A preferred pillar height (h) is set at 0.762 mm. The use of pillars with smaller dimensions allows more rows to be inserted in a given area and thus increasing the out-of-band suppression level. FIG. 7 shows an alternate version of the PCJ 700 with the perfect or near perfect magnetic wall 702 and plane wave exciting port 704. The alternate version interleaves rows of pillars of different sizes in various positions. The values of w in FIG. 6 and FIG. 7 are 6.858 mm and d=12.07 mm.

Figure 8A:
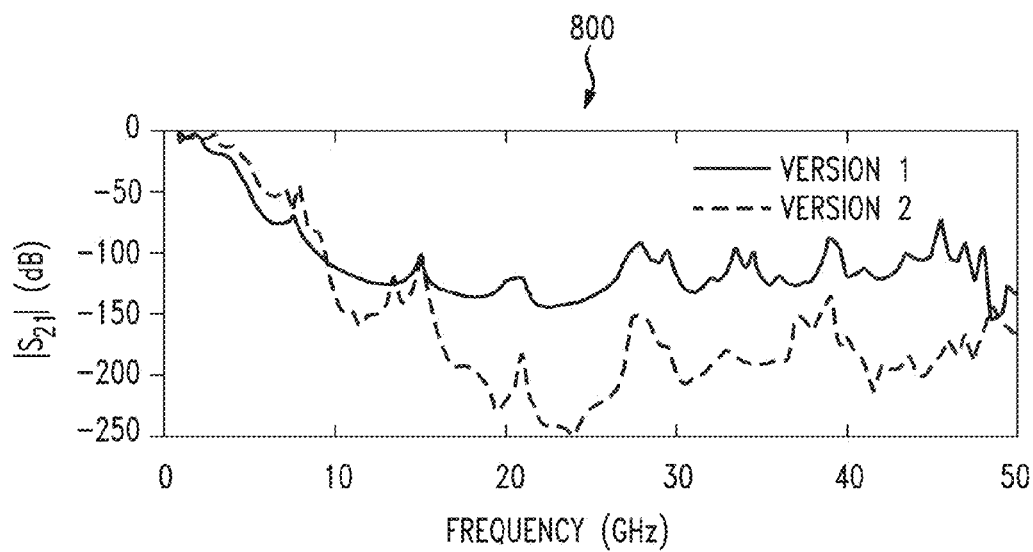
FIGS. 8A and 8B are graphs showing a simulation of the frequency response of $|S_{21}|$ for two versions of the photonic choke joint.
Figure 8B:
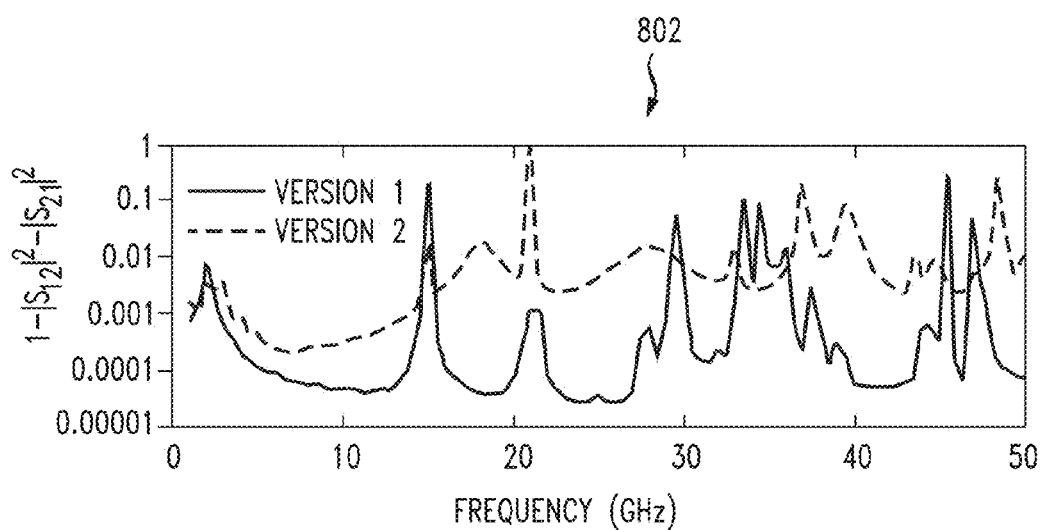

Simulation results in FIG. 8A in graph 800 show the simulated $S_{21}$ response of two PCJ's with the dielectric spacing of $t_1=25$ μm and $t_2=0$ μm. FIG. 8B also shows graph 802, which simulates the $1-|S_{11}|^2-|S_{21}|^2$ response with the same dielectric spacing. These graphs show that this approach can produce more than 50 dB of attenuation up to more than seven times its operating frequency with 5 pillar rows.

To increase the suppression level further, additional metallic pillars can be inserted between the existing tiling as shown FIG. 7. An additional suppression of 40 dB was achieved for this infinite array tiling. The absorptive loss, defined as $1-|S_{11}|^2-|S_{21}|^2$, due to dielectric layer increases with the structure complexity as shown in simulation results in FIGS. 8A and 8B.

Thus, an example embodiment of a choke joint includes a first array of pillars positioned on a substrate. Each pillar in the first array of pillars can have a first size and be configured to receive an input plane wave at a first end of the choke joint, the choke joint having a second end configured to transmit the input plane wave away from the choke joint. The choke joint includes a second array of pillars positioned on the substrate between the first array of pillars and the second end of the choke joint. Each pillar in the second array of pillars can have a second size. Such a configuration is shown in FIGS. 6 and 7, by way of example. The choke joint could also have a third array of pillars positioned on the substrate between the second array and the second end of the choke joint, each pillar in the third array of pillars having a third size. In one embodiment, the first size is larger than the second size, and the second size is larger than the third size. All the sizes could be the same or reasonably similar in another embodiment. In another embodiment, all the sizes are different, as are shown in the figures.

Each metal pillar of the first array, the second array and the third array can have any number of shapes and may be the same shape or different shapes. The shape can be one or more of a square, a rectangle, a circle, a parallelogram, a pentagon, a random shape, and so forth. Any mixture of shapes could also exist either throughout the choke joint, or on an array by array basis, and so forth. Thus, the use of squares in the figures is only meant as a suggested exemplary shape for the pillars.

Each pillar of the first array, the second array, and the third array can be positioned on the substrate such that a corner of each pillar points to the first end. The choke joint can further include a fourth array of pillars interleaved near the second array of pillars, the fourth array having the third size. This interleaving is illustrated in FIG. 7. The choke joint can also include a fifth array of pillars interleaved near the first array of pillars, the fifth array having the second size.

A configuration of the second array of pillars interleaved with the fourth array of pillars can include a first row of pillars from the fourth array of pillars being nearer to the first end, followed by a first row of pillars from the second array of pillars, followed by a second row of pillars from the fourth array of pillars, followed by a second row of pillars from the second array of pillars. Again, an example of this structure is shown in FIG. 7.

The fifth array of pillars interleaved in the first array of pillars can include a first row of pillars from the fifth array of pillars followed by a row of pillars from the first array of pillars, followed by a second row of pillars from the fifth array of pillars.

Figure 1:
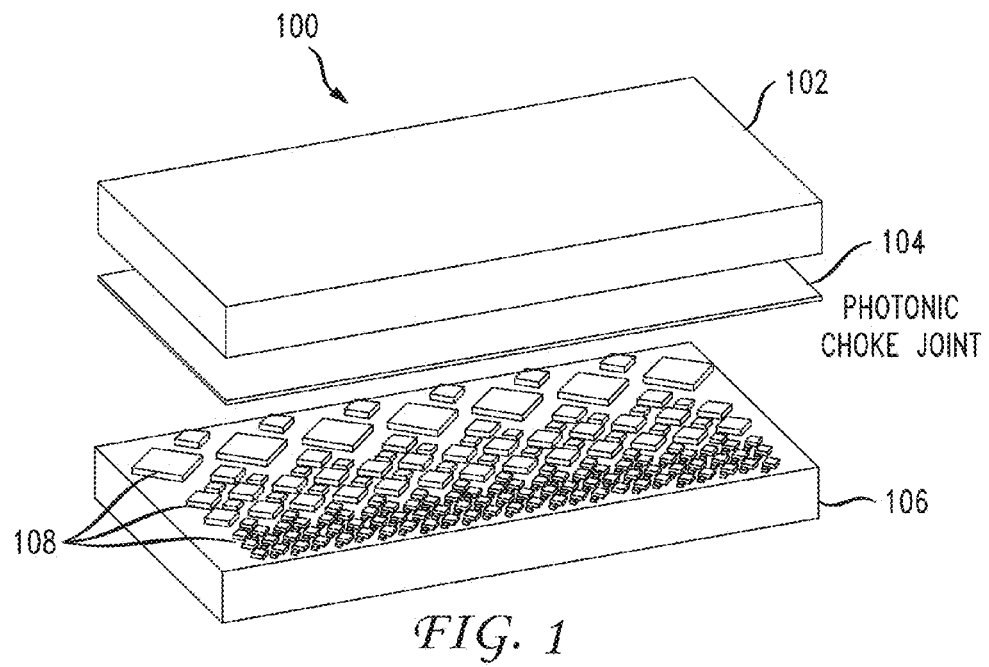
FIG. 1 illustrates the photonic choke joint in several pieces prior to delivery.
Figure 2:
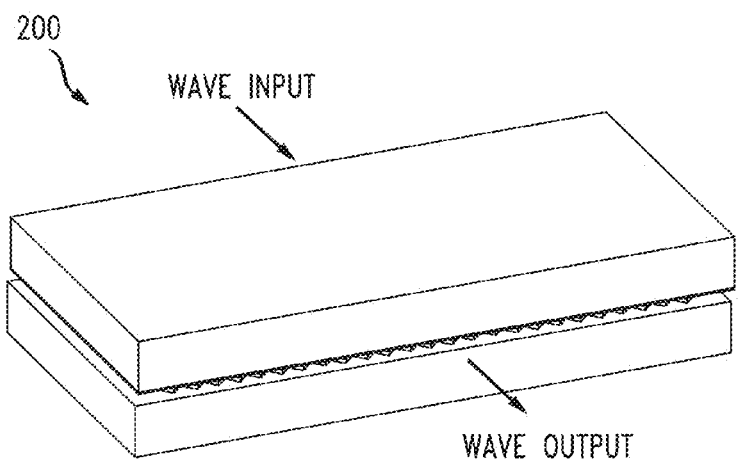
FIG. 2 illustrates the photonic choke joint after assembly.
Figure 3:
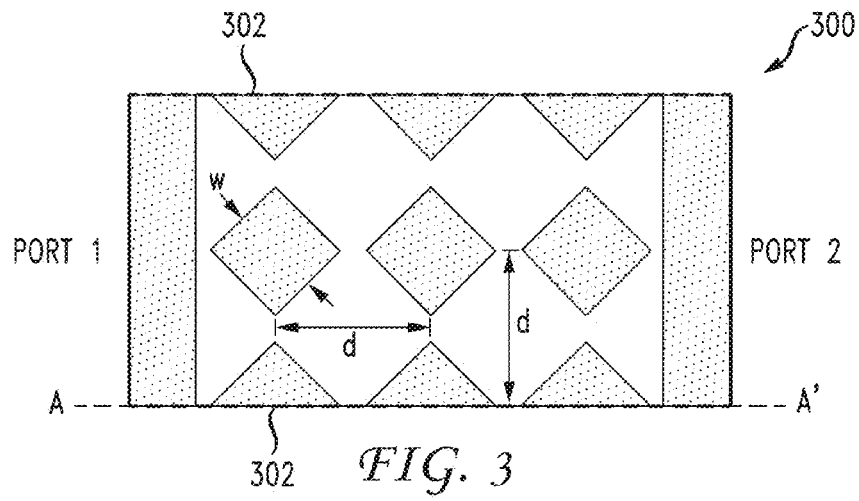
FIG. 3 illustrates a top view of the photonic choke joint.
Figure 4:
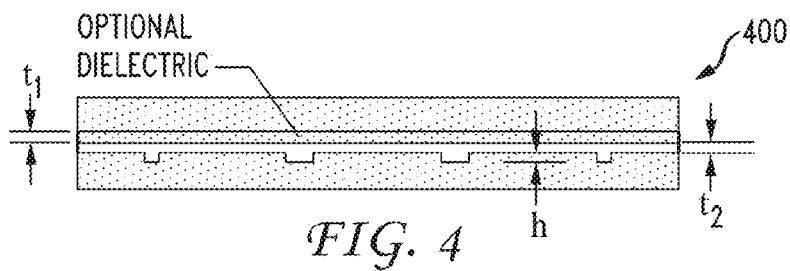
FIG. 4 illustrates a side view of the photonic choke joint.
Figure 5:
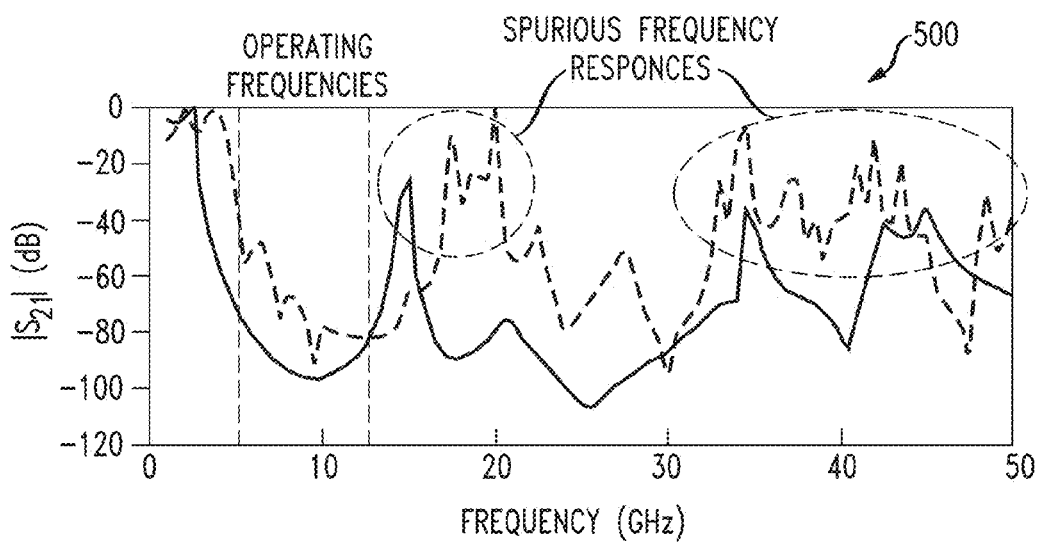
FIG. 5 is a graph of the simulated broadband frequency response.

A top metal surface can be positioned above the first array, the second array and the third array of pillars. An example of this surface is shown as feature 102 of FIG. 1. Feature 104 represents an optional dielectric that could be used. The first array of pillars, the second array of pillars and the third array of pillars each is made of one of metal and a dielectric. The top metal surface and the first array, the second array and the third array of pillars can be separated by a distance t.

In another embodiment, the first array of pillars, the second array of pillars, the third array of pillars, the fourth array of pillars, and the fifth array of pillars each are pillars that are made of one of metal and a dielectric.

The first size can be, for example, a pillar width of 6.858 mm, the second size can be a pillar width of 3.429 mm and the third size can be a pillar width of 1.715 mm. The first size can include a pillar width within a range of 6.5 mm and 7.0 mm, the second size can include a pillar width within a range of 3.2 mm and 4.0 mm, and the third size can include a pillar width within a range of 1.2 mm and 2.2 mm.

A pillar size and a pillar spacing of pillars can be chosen as a size relative to a choke joint width. Examples of this approach include selecting a pillar size of 0.4a, wherein a is the choke joint width. The choke joint can have a pillar spacing of 0.68a, wherein a is the choke joint width. An example range of a is between 16 mm and 18 mm. In one embodiment, a is 17.15 mm.

Figure 9:
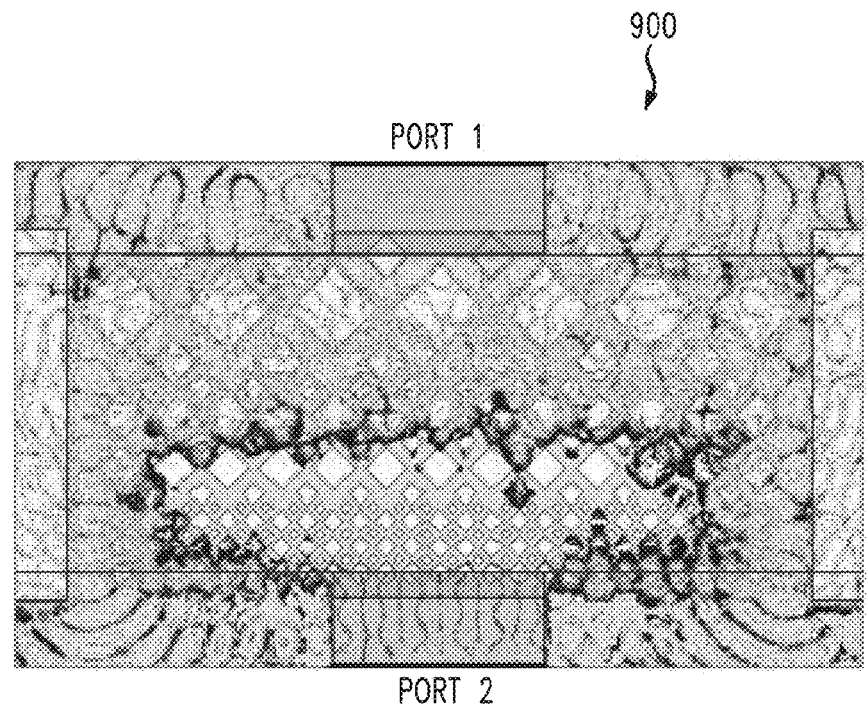
FIG. 9 is a graph showing a simulation of the frequency response of $1-|S_{11}|^2-|S_{21}|^2$ for the two versions of the photonic choke joint.
Figure 10:
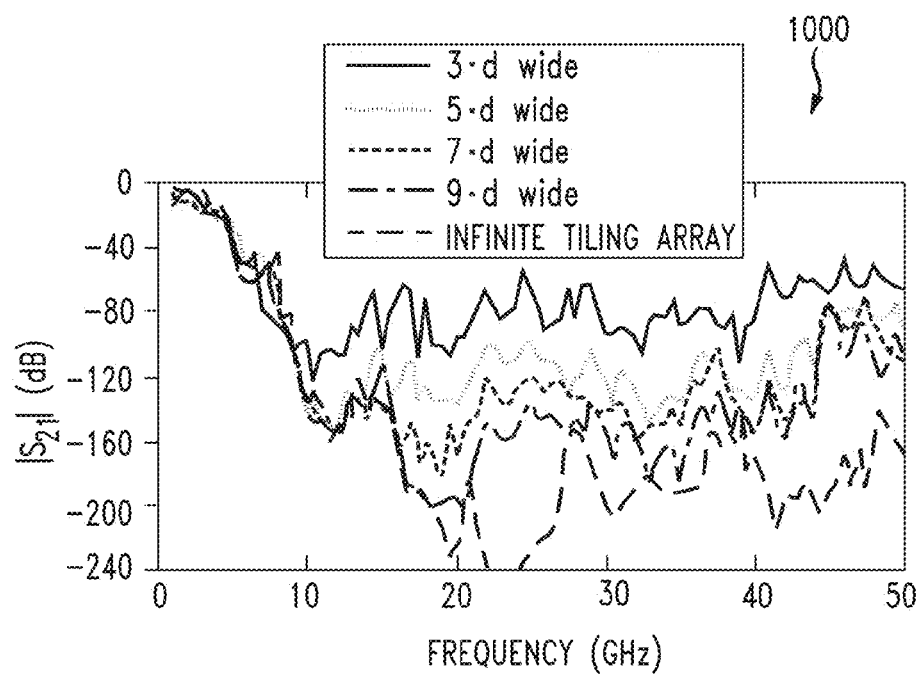
FIG. 10 illustrates a graph of a simulation for a finite number of pillar rows in comparison to an infinite tiling array.

Next discussed is the PCJ suppression performance limitations. Although the designs discussed above can achieve wide-band and high-suppression levels, in practical implementations, performance is limited by the structure not being infinitely wide and the achievable conductor separation. By modeling the proposed PCJ (see FIG. 9), one observes that the electric fields can propagate around the dielectric and air surrounding a finite section of tiling. FIG. 9 illustrates the simulated electric field in the dielectric at 50 GHz and shows the leakage around the PCJ (with the version of pillars shown in FIG. 7, and a side of 7*d wide) with $t_1=25$ μm and $t_2=0$ μm. This results in a significant reduction of isolation when excited with a finite width microstrip-port. As number of pillar rows increases, isolation increases as shown in the graph 1000 of FIG. 10.

Figure 11:
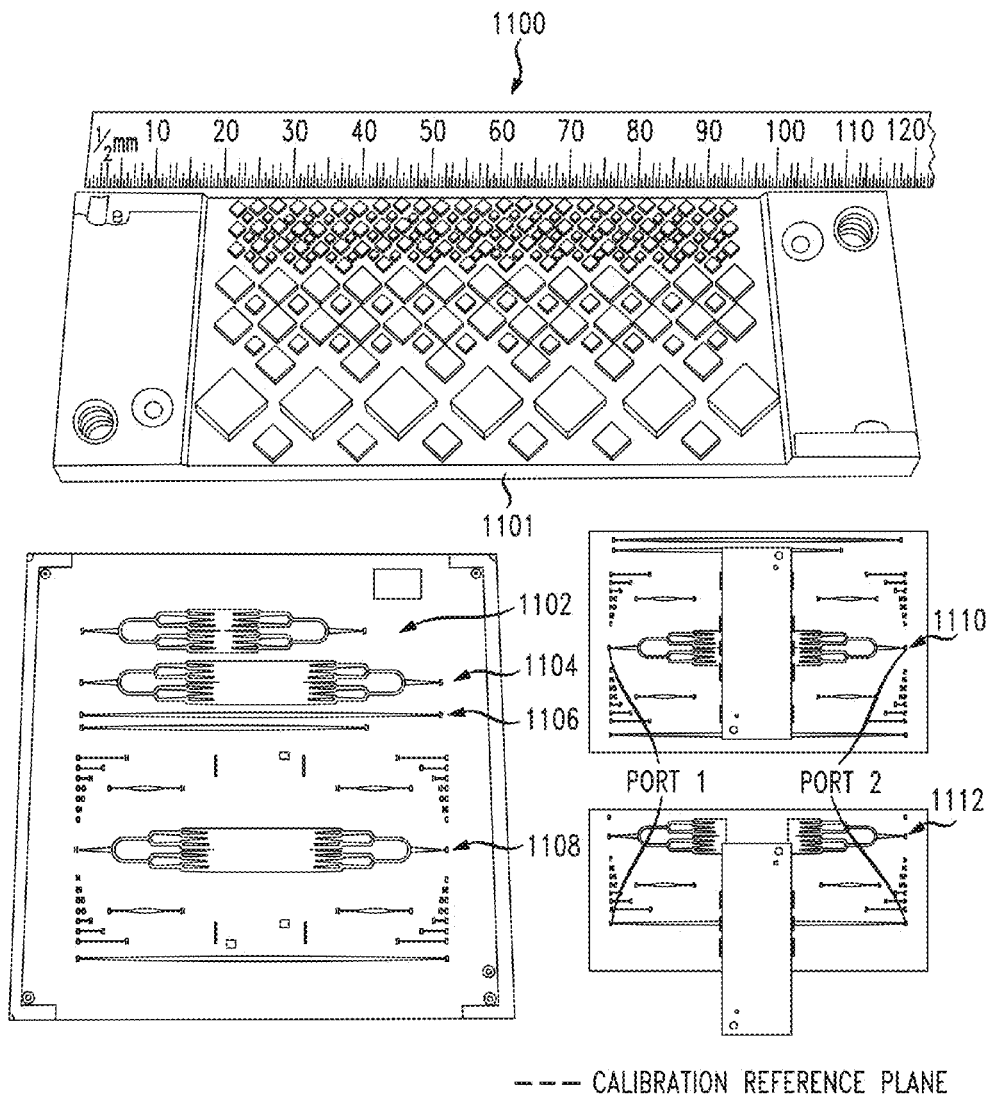
FIG. 11 illustrates various fabricated photonic choke joints.
Figure 12:
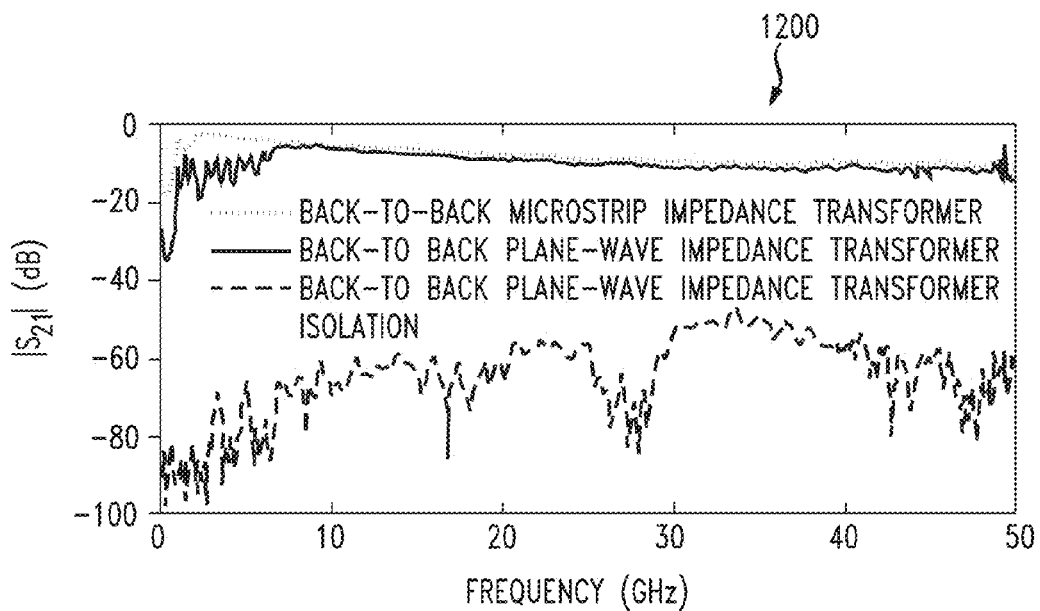
FIG. 12 illustrates some measured transmission of some of the micro-strip line and plane-wave impedance transformers of FIG. 11.

A prototype of PCJ (version of FIG. 7; 7*d wide) was constructed to verify its ability to suppress plane-wave propagation. To launch plane-wave into the PCJ and calibrate for line losses, various broadband microstrip impedance transformers on 25.4 µm-thick Polyflon Cuflon dielectric (with ∈r=2.05 and loss tangent of 0.00045) were designed and fabricated as shown in FIG. 11. The microstrip impedance transformers 1102, 1104 and 1108 transform a 50 Ohm line into a 0.4 Ohm line by splitting 50 Ohm line into eight sections and combining them in-phase and in parallel to mimic plane-wave transmission. This approach was used to prevent the spurious mode from being excited along the width of the microstrip line up to 48 GHz. The continuous optimal impedance taper transformer profile was used in this design to minimize the total length as well as eliminate discontinuity in the line width. The measurement result in the graph 1200 of FIG. 12 shows that this transformer can provide low transmission-ripple plane-wave-like excitation for the PCJ measurement from 7 to 50 GHz, while the narrower microstrip transformer design (shown as feature 1106 of FIG. 11) is used for the PCJ transmission calibration between 2 and 7 GHz.

Figure 13:
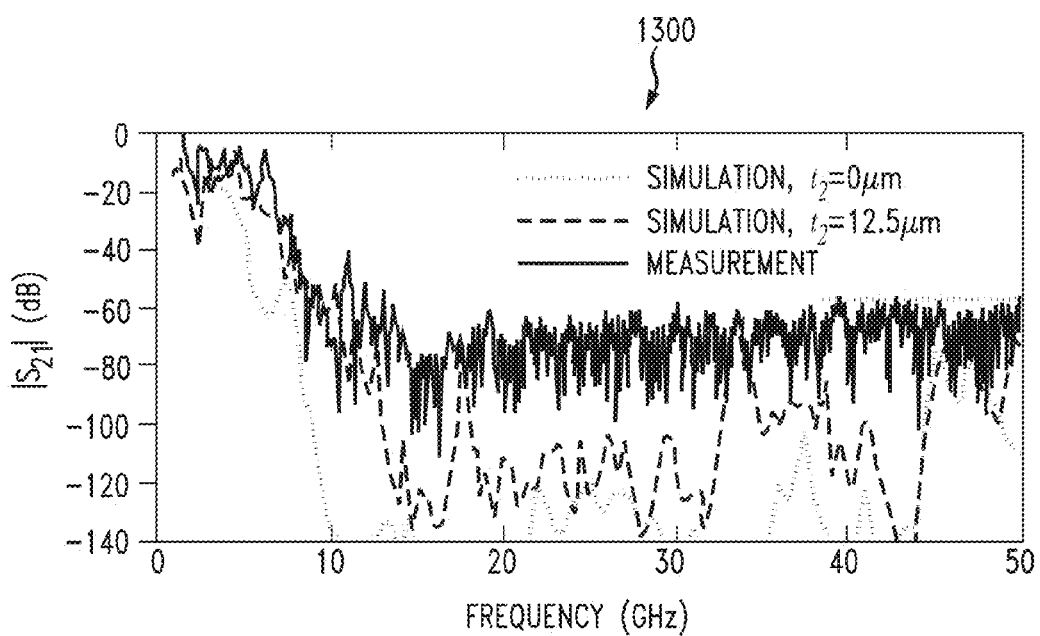
FIG. 13 illustrates the combined measurement of the quasi-TEM and plane-wave mode propagation inside of the photonic choke joint.

To measure PCJ transmission responses, the PCJ was placed on top of the dielectric between two impedance transformers as shown in feature 1108 of FIG. 11. The signal was transmitted and received through a microstrip line using Cascade Infinity probes I50-A-GSG-250. The measurement was performed using Agilent vector network analyzer N5245A and it was calibrated at the microwave probe tips using Short-Open-Load-Thru calibration standard substrate. With the DC resistance between two ports of 0.4 Ohm, the PCJ can provide more than 56 dB of suppression from 12 GHz to 50 GHz when the PCJ is ~12.5 µm away from the dielectric substrate, as shown in the measurement results in the graph 1300 of FIG. 13. As the conductor spacing increases, spurious response occurred resulting in lower isolation as anticipated from modeling. To measure the PCJ response below 7 GHz, a microstrip with narrow impedance transformer was used as shown in feature 1112 of FIG. 11. In this setup, quasi-transverse electromagnetic wave was excited and received at the other end above 2 GHz with low input return loss. As a result, the full measured PCJ transmission response was obtained in FIG. 13. The level of suppression is higher than the isolation between two one-ended plane wave impedance transformers, indicating the PCJ's effectiveness in reflecting signal.

A new photonic choke joint structure with sub-array Cartesian-tiling pillars was developed. The structure is simple to fabricate and made from one material. With the fabricated microwave-to-plane wave mode converter, the broadband characteristic of the proposed PCJ can be verified on a 25.4 µm thick dielectric. The use of a thin film dielectric layer would reduce the isolation-spacer thickness and improve the performance. Measured results demonstrated that the device can provide broadband signal rejection of more than 56 dB up to more than 6 times its nominal in-band operating frequency.

The various embodiments described above are provided by way of illustration only and should not be construed to limit the scope of the disclosure. For example, the principles herein can be varied and extend beyond given distances or heights as described. Any distance, width or thickness disclosed herein can also be varied in one direction or another by 40% and remain within the scope of this disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A choke joint, the choke joint comprising:
    a first array of pillars positioned on a substrate, each pillar in the first array of pillars having a first size and configured to receive an input plane wave at a first end of the choke joint, the choke joint having a second end configured to transmit the input plane wave away from the choke joint;
    a second array of pillars positioned on the substrate between the first array of pillars and the second end of the choke joint, each pillar in the second array of pillars having a second size;
    a third array of pillars positioned on the substrate between the second array of pillars and the second end of the choke joint, each pillar in the third array of pillars having a third size; and
    a fourth array of pillars interleaved near the second array of pillars, each pillar in the fourth array of pillars having the third size,
    wherein a configuration of the second array of pillars interleaved with the fourth array of pillars comprises a first row of pillars from the fourth array of pillars being nearer to the first end, followed by a first row of pillars from the second array of pillars, followed by a second row of pillars from the fourth array of pillars, followed by a second row of pillars from the second array of pillars.

2. The choke joint of claim 1, wherein the first size of the first array of pillars is larger than the second size of the second array of pillars, and wherein the second size of the second array of pillars is larger than the third size of the third array of pillars.

3. The choke joint of claim 1, wherein each metal pillar of the first array, the second array and the third array is shaped as one of a square and a rectangle.

4. The choke joint of claim 3, wherein each pillar of the first array, the second array and the third array is positioned on the substrate such that a corner of the each pillar points to the first end.

5. The choke joint of claim 1, the choke joint further comprising: a fifth array of pillars interleaved near the first array of pillars, each pillar in the fifth array of pillars having the second size.

6. The choke joint of claim 5, wherein the fifth array of pillars interleaved in the first array of pillars comprises a first row of pillars from the fifth array of pillars followed by a row of pillars from the first array of pillars, followed by a second row of pillars from the fifth array of pillars.

7. The choke joint of claim 1, the choke joint further comprising:
    a top metal surface positioned above the first array, the second array and the third array of pillars.

8. The choke joint of claim 1, wherein the first array of pillars, the second array of pillars and the third array of pillars each comprises pillars that are one of a metal and a dielectric.

9. The choke joint of claim 5, wherein the first array of pillars, the second array of pillars, the third array of pillars, the fourth array of pillars and the fifth array of pillars each comprises pillars that are made of one of a metal and a dielectric.

10. The method of claim 7, wherein the top metal surface and the first array, the second array and the third array of pillars are separated by a distance t.

11. The choke joint of claim 1, wherein the first size comprises a pillar width of 6.858 mm, the second size comprises a pillar width of 3.429 mm and the third size comprises a pillar width of 1.715 mm.

12. The choke joint of claim 1, wherein the first size comprises a pillar width within a range of 6.5 mm and 7.0 mm, the second size comprises a pillar width within a range of 3.2 mm and 4.0 mm, and the third size comprises a pillar width within a range of 1.2 mm and 2.2 mm.

13. The choke joint of claim 1, wherein a pillar size and a pillar spacing of pillars are chosen as a size relative to a choke joint width.

14. The choke joint of claim 13, wherein the pillar size is 0.4a, wherein a is the choke joint width.

15. The choke joint of claim 13, wherein the pillar spacing is 0.68a, wherein a is the choke joint width.

16. The choke joint of claim 14, wherein a is between 16 mm and 18 mm.

17. The choke joint of claim 16, wherein a is 17.15 mm.

18. The choke joint of claim 1, wherein each of the first size, the second size, and the third size is a different size.

\* \* \* \* \*